United States Patent
Beck et al.

(10) Patent No.: US 9,644,682 B2
(45) Date of Patent: May 9, 2017

(54) ROLLING BEARING WITH INTEGRATED HOLDING FLANGE AND METHOD FOR PRODUCING A ROLLING BEARING

(71) Applicant: AKTIEBOLAGET SKF, Göteborg (SE)

(72) Inventors: Burkard Beck, Unterpleichfeld (DE); Alexander Dilje, Schweinfurt (DE); Hans-Juergen Friedrich, Königsberg-Römershofen (DE); Helmut Hauck, Euerbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 41 days.

(21) Appl. No.: 14/653,030

(22) PCT Filed: Dec. 17, 2013

(86) PCT No.: PCT/EP2013/076860
§ 371 (c)(1),
(2) Date: Jun. 17, 2015

(87) PCT Pub. No.: WO2014/095829
PCT Pub. Date: Jun. 26, 2014

(65) Prior Publication Data
US 2016/0010693 A1    Jan. 14, 2016

(30) Foreign Application Priority Data
Dec. 17, 2012 (DE) .......................... 10 2012 223 449

(51) Int. Cl.
*F16C 35/04* (2006.01)
*F16C 35/077* (2006.01)
(Continued)

(52) U.S. Cl.
CPC ...... *F16C 35/045* (2013.01); *B29C 45/14065* (2013.01); *B29C 45/14467* (2013.01);
(Continued)

(58) Field of Classification Search
CPC ...................................... F16C 35/045
See application file for complete search history.

(56) References Cited

U.S. PATENT DOCUMENTS 2,166,673 A * 7/1939 Barr ................. F16C 19/46
384/561
3,767,279 A * 10/1973 Hallerback ........... F16C 33/768
384/539

(Continued)

FOREIGN PATENT DOCUMENTS

DE    1400226 A1    11/1968
DE    2159263 A1    6/1973
(Continued)

*Primary Examiner* — Thomas R. Hannon
(74) *Attorney, Agent, or Firm* — Bryan Peckjian; SKF USA Inc. Patent Dept.

(57) ABSTRACT

A rolling-element bearing assembly includes a bearing ring and a flange. The bearing ring has a surface including at least one circumferential groove extending at least partially around the bearing ring, and the flange projects radially inwardly or radially outwardly from the surface and has a flange section at a radially inner edge or radially outer edge of the flange that projects into the groove. A hardened casting material secures the flange to the surface.

12 Claims, 5 Drawing Sheets

(51) Int. Cl.
  *F16C 19/06*   (2006.01)
  *F16C 33/58*   (2006.01)
  *B29C 45/14*   (2006.01)
  *B29K 705/00*   (2006.01)
  *B29L 31/04*   (2006.01)

(52) U.S. Cl.
  CPC ............ *F16C 19/06* (2013.01); *F16C 33/586*
    (2013.01); *F16C 35/077* (2013.01); *B29K*
    *2705/00* (2013.01); *B29L 2031/04* (2013.01);
    *F16C 2226/52* (2013.01)

(56) References Cited

U.S. PATENT DOCUMENTS

| | | | |
|---|---|---|---|
| 3,806,214 A | | 4/1974 | Keiser |
| 4,125,298 A | * | 11/1978 | Heurich ............... F16D 1/072 |
| | | | 29/520 |
| 5,237,748 A | * | 8/1993 | Glinski ............... F16C 19/46 |
| | | | 29/530 |
| 6,505,973 B2 | * | 1/2003 | Buchheim ............ F16C 19/54 |
| | | | 29/898.07 |
| 8,091,240 B2 | * | 1/2012 | Katougi ............... F16C 33/586 |
| | | | 29/505 |

FOREIGN PATENT DOCUMENTS

| | | |
|---|---|---|
| DE | 19935469 A1 | 5/2000 |
| DE | 10329433 A1 | 1/2005 |
| DE | 10355407 B3 | 5/2005 |
| EP | 2014937 A2 | 1/2009 |
| FR | 2853371 A1 | 10/2004 |
| JP | 2000074079 A | 3/2000 |

* cited by examiner

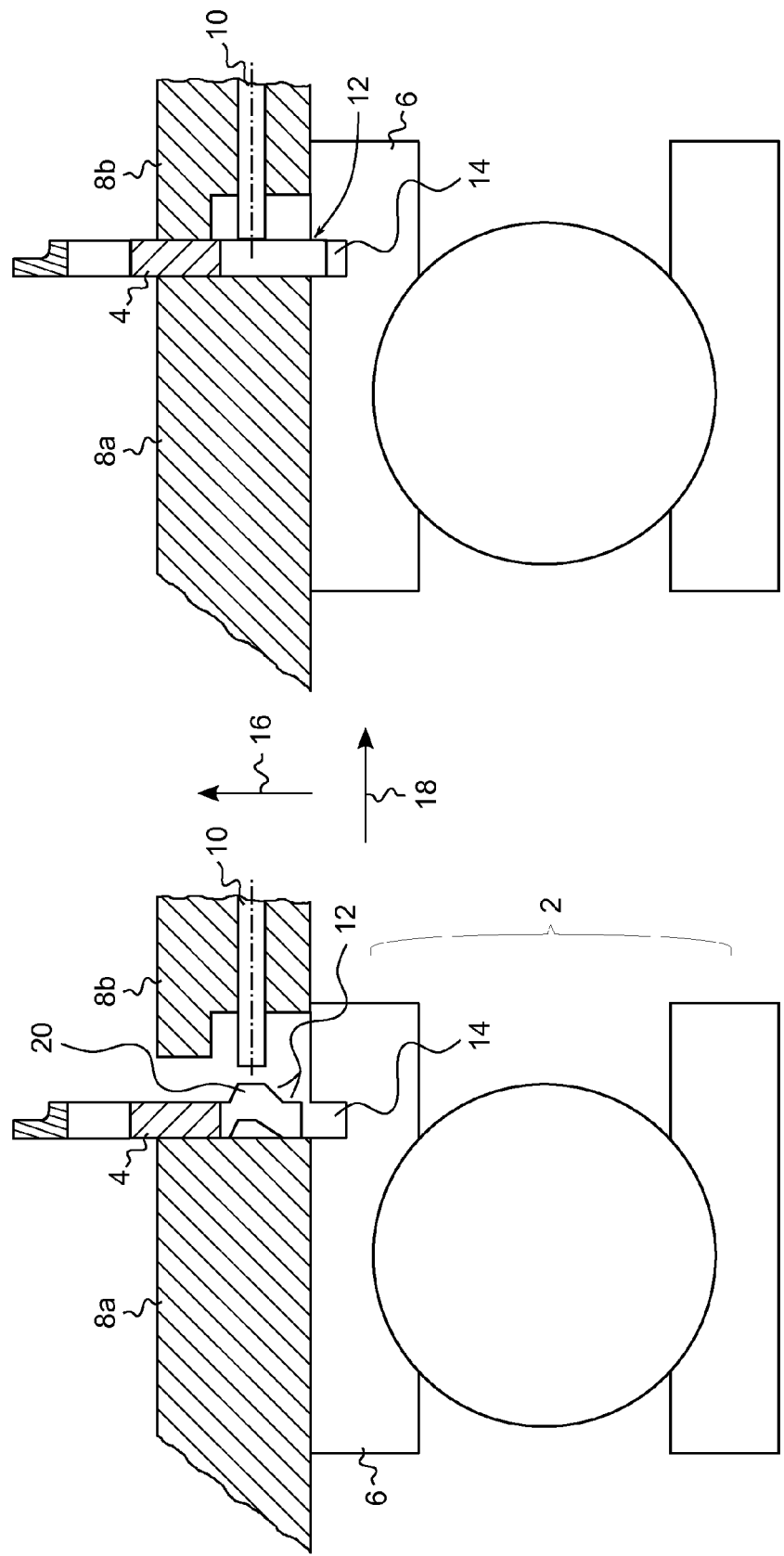

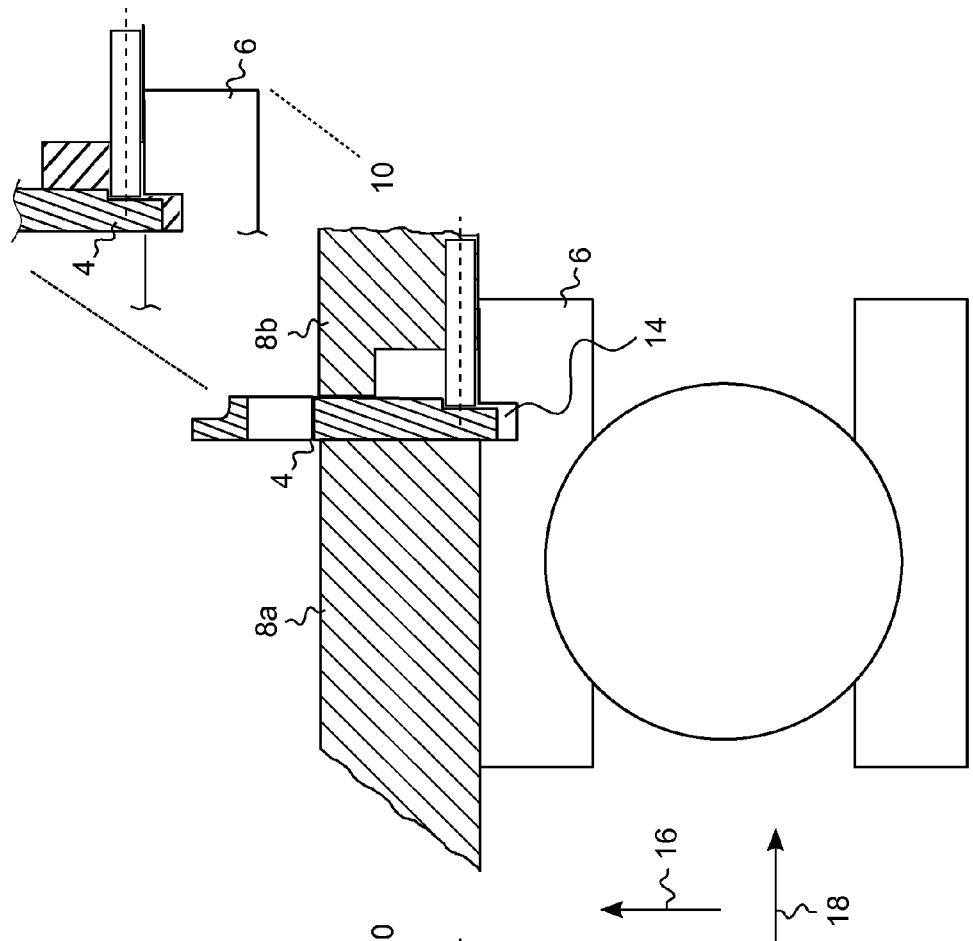
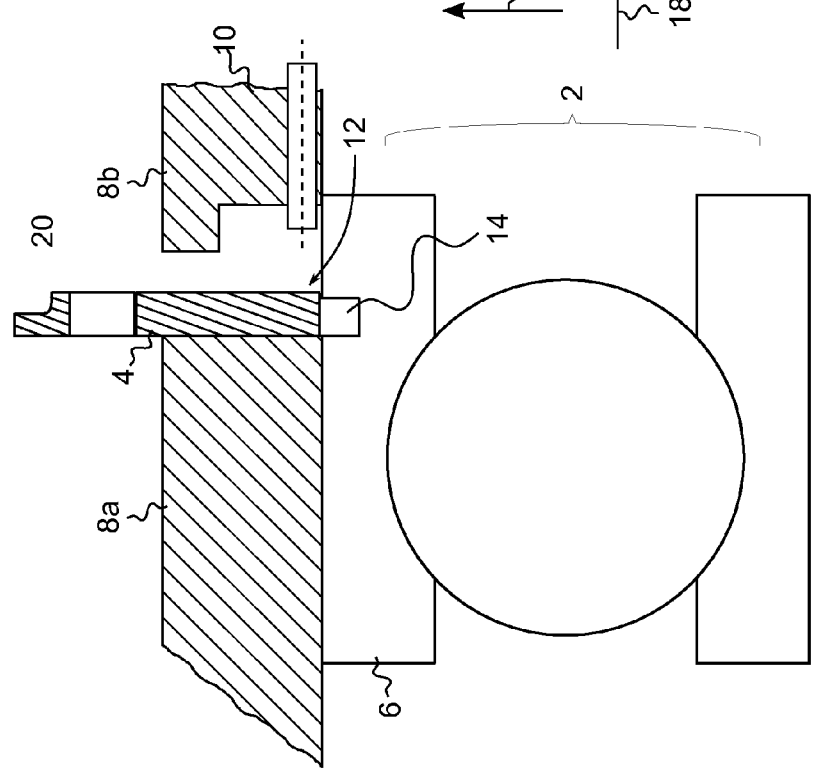

ROLLING BEARING WITH INTEGRATED HOLDING FLANGE AND METHOD FOR PRODUCING A ROLLING BEARING

CROSS-REFERENCE

This application is the U.S. National Stage of International Application No. PCT/EP2013/076860 filed on Dec. 17, 2013, which claims priority to German patent application no. 10 2012 223 449.7 filed on Dec. 17, 2012.

TECHNOLOGICAL FIELD

Exemplary embodiments of the present invention are concerned with a rolling-element bearing including a retaining flange and with a method for manufacturing a rolling-element bearing assembly.

BACKGROUND

In some applications, rolling-element bearings are axially fixed in a housing or to another object. To make this possible, at least one bearing ring is often provided with a solid flange. That is, the bearing inner ring or the bearing outer ring includes a flange or is connected to a flange, and often the bearing ring and the flange are manufactured from one part, i.e., one-piece, for example as a forged part. In addition, it is also known to attach a flange to a bearing ring. For example, a bearing carrier, e.g., a bearing housing, may be is often provided, with a flange, and the rolling-element bearing or the bearing ring of the rolling-element bearing may be connected to the bearing housing in a friction-fit-, materially-bonded-, and/or interference-fit-manner. In this context "interference-fit" means a connection that prevents a relative movement of the mutually connected components in at least one connection direction and that the geometry of the components used for the connection is selected such that they overlap in a direction preferably perpendicular to the connection direction in order to prevent the movement in the connection direction. In this context "friction-fit" means a connection that prevents a relative movement of the mutually connected components in at least one direction by a force between the components acting perpendicular to the connection direction, which, for example, leads to increased cohesion- or adhesion-forces. A friction fit is present in particular as long as a force between the components effected by the static friction is not exceeded. In this context "materially-bonded" means a connection that prevents a relative movement of mutually connected components in at least one direction imparted by atomic or molecular forces. Here a mixing of the materials of the connected components can at least partially occur at a boundary surface. This need not occur exclusively between the materials of the connected components alone. Rather, in addition a material component effecting or supporting the mixing, for example, in the form of an adhesive or of a material of a welding rod can be present so that a plurality of materials are mixed with one another on a microscopic scale at the boundary surface.

One of the known possibilities is to connect the bearing ring or the rolling-element bearing to the bearing housing in an interference-fit manner by overmolding with plastic. The methods used to date are extremely time- and cost-intensive, since these make necessary expensive processings of the components used, for example, the forging of a bearing ring in a one-piece component or the machining of a bearing carrier.

There is therefore a need to provide a method, using which a bearing ring or a rolling-element bearing including a flange for axial attaching of the rolling-element bearing can be manufactured cost-effectively and efficiently.

SUMMARY

Exemplary embodiments make this possible by providing a groove on a bearing ring, for example on a bearing inner ring or on a bearing outer ring. The groove may be disposed on a circumference of the bearing ring, extending along the circumference, and a flange section serving for the connection to the bearing ring may be introduced into the groove during the manufacturing process by a material displacement of a preformed flange. In particular, the flange is preformed such that, depending on whether the flange is to be connected to the bearing inner ring or the bearing outer ring, the flange includes, on a radially inner or on a radially outer end thereof, a flange section for connecting to the bearing ring. During manufacture of the rolling-element bearing or the rolling-element bearing assembly, the flange is positioned so it is located adjacent to the groove in the radial direction, i.e., lies outside the groove to a radially inner side of the groove if the groove is formed in an inner surface or to a radially outer side of the groove if the groove is formed in an outer surface.

Subsequently the flange and the bearing ring are fixed relative to each other, whereupon the flange is deformed in the flange section such that a material of the flange is displaced by the deforming, and the flange section of the flange moves at least partially into the groove. That is, during manufacturing, due to the exerting of a force the material of the flange is displaced such that it moves into the groove in order to prevent there, by an interference-fit, that the flange be able to move axially relative to the bearing ring after the deforming. Thus by the making of a simple groove in the bearing ring as well as by suitable cold working of a metal plate for the flange using a single further step of the cold working, a connection of the flange to the bearing ring can be produced in a cost-effective manner without expensive machining methods or forging methods being required. According to some exemplary embodiments, the connection region, i.e., that region wherein after the deforming of the elevation or after the displacement of the material the flange extends into the groove, is cast with a casting compound, which on the one hand effects an additional stabilizing of the connection and on the other hand can prevent a possible elastic spring-back deformation of the material of the flange, which could possibly lead to the flange section moving at least partially back out of the groove.

According to some exemplary embodiments, inside the flange section the flange further has an elevation 20 extending in an axial direction out of the plane of the flange, onto which elevation 20 the force for deforming and displacing of the material is exerted.

According to some preferred exemplary embodiments, the deforming of the flange section is carried out during the injection-molding process, i.e., while the bearing ring and the flange are held in an injection mold or a tool. Here without an additional method step the bearing ring can initially be fixed with respect to the flange using a closing injection mold. In this fixed position the material of the flange section such as, for example, the elevation in the preproduced flange can be deformed using a stamp form movable with respect to a partial mold of the injection mold or one or more stamps movable with respect to the injection mold. According to some preferred exemplary embodiments, the casting compound is sprayed-in into the injection mold while the stamp form still exerts the force, so that, for example, possible elastic spring-back deformings are also counteracted after lifting of the stamp form by the sprayed-in and hardened injection-molding compound. According to some preferred exemplary embodiments, the stamp form or the stamp- and the injection-mold are opened again only after the complete hardening of the injection-molding compound.

According to some exemplary embodiments of the present invention, the groove is provided such that it encircles completely along the circumference so that an exact adjusting of the flange or of the flange section serving for the connection with respect to the groove can be omitted during production.

According to some exemplary embodiments of the invention, the bearing ring and the flange are each comprised of a metallic material.

The flange section, which serves for the interference-fit connection in the axial direction and extends at least partially into the groove after the deforming of the material of the flange, can have any shape and geometry here. For example, a plurality of tabs uniformly distributed over the circumference can extend radially inward or outward, whose outer ends are pressed into the groove by the deforming, or a completely radially encircling flange section can be pressed into the groove by the displacement of the material. Any geometries are thus possible for the connection of this type.

In other words, according to some exemplary embodiments of the present invention a bearing or a bearing ring is manufactured including a simple groove, as well as flange matching thereto with respect to the dimensioning, which can be prefabricated by pure stamping- and reshaping-technologies alone. The two parts are placed in an injection-molding tool. When closing the tool the bearing ring and the flange are fixed relative to each other. A special flange section of the metal-plate part of the flange, for example, an elevation thereof, which is supported on one side of the injection-molding tool, is elastically and/or plastically deformed such that the preformed contour or a flange section of the flange at least partially engages in an interference-fit manner into the groove on the bearing ring. Under this preloading or after the inelastic deforming a fill material, for example a plastic, is then sprayed-in in the resulting free space. Here the undercut, i.e., the interference-fit of the flange section and the groove, is eternalized, so to speak, so that after completed hardening of the injection-molding material the interference-fit is maintained even after moving apart of the injection-molding tool or of the workpiece.

It is self-evident that in addition to plastics, other fill materials or injection-molding materials can be used to stabilize the connection. For this purpose injection-molding processes are preferably used; however, all other known forming processes are also conceivable, such as, for example, pressing processes.

In particular, according to some exemplary embodiments a part of the fill material extends at least partially also into the groove, so that possible undercuts in the groove or between groove and flange are backfilled, which contributes to a better axial fixing of the connection or of the interference-fit between bearing ring and flange.

By this method it is possible to provide standardized rolling-element bearings or bearing rings in a cost-effective manner using any geometries of flanges, which can be used, for example, in the sense of a modular system to make any applications possible in a simple manner. Here, for example, an otherwise necessary plunge grinding is avoided.

In addition, the grooves in the ring do not need to be closely toleranced, i.e., both the material thickness of the flange and the thickness of the groove do not need to satisfy the normal requirements of a fit, since a tolerance compensation can be achieved by the overmolding process or the casting compound. A simple flange made from metal-plate, which can be manufactured by conventional reshaping-, stamping-, or bending operations, can be used for the method. If, as according to some exemplary embodiments, the injection tool or the injection mold is used to generate the interference-fit connection between flange and bearing ring, no additional assembly steps are required. The axial forces between flange and bearing or rolling-element bearing can be supported without aging influences, which can significantly improve the longevity, for example, compared to manufacturing methods wherein the connection is effected by overmolding of the bearing ring in a bearing carrier. Due to the manufacturing method the axial forces can be supported in both directions since the undercut of the two metallic materials acts in both axial directions. In addition, the abutment surface on the flange for the screw attachments of the flange is made from metal, which in contrast to comparable geometries with plastic bearing carriers, which are generated by pure injection-molding, leads to a better determining of the geometry of the bearing assembly, since after the manufacturing of the rolling-element bearing or of the rolling-element bearing assembly no more settling of the plastic occurs, even if it is impinged with the force of a screw.

BRIEF DESCRIPTION OF THE DRAWINGS

Preferred exemplary embodiments of the present invention are explained in more detail below, referring to the included Figures:

FIG. 1 shows a sectional view through a deep groove ball bearing as well as through a flange to be connected to the deep groove ball bearing during manufacturing;

FIG. 2 shows the sectional view of FIG. 1 during the method, wherein a material displacement into the groove has taken place;

FIG. 8a, b show a sectional view through a deep groove ball bearing as well as through a flange to be connected to the deep groove ball bearing during manufacturing.

DETAILED DESCRIPTION

Figure 4:
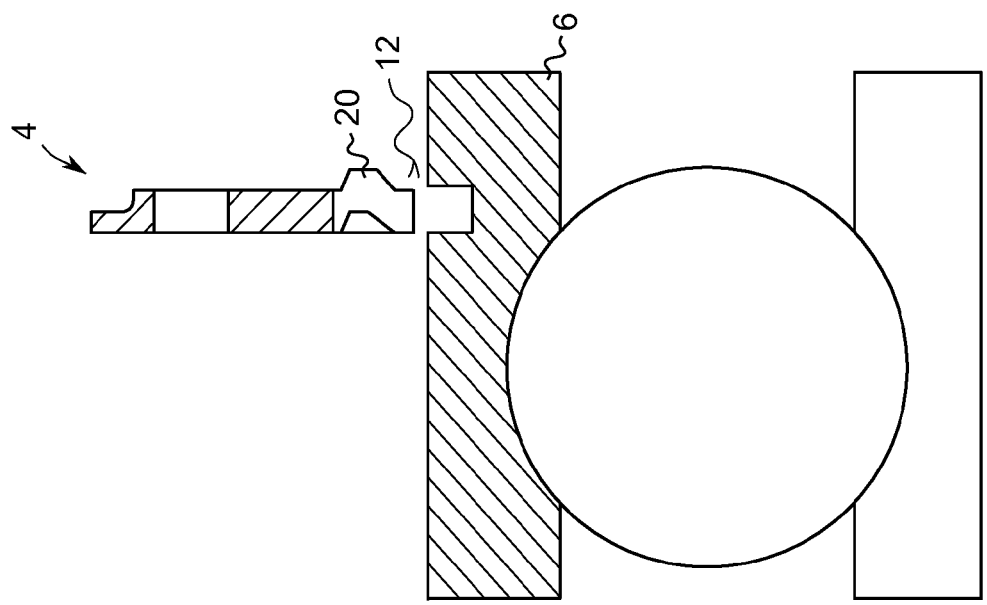
FIG. 4 shows the prefabricated components required for manufacturing of a rolling-element bearing assembly according to some exemplary embodiments of the present invention.

FIG. 1 shows a section through a ball bearing 2 as well as through a flange 4 corresponding to the ball bearing 2, which flange 4 is connected to the ball bearing 2 or to its bearing outer ring 6 by an exemplary embodiment of an inventive manufacturing method. It is self-evident here that although in the example shown in FIG. 1 the flange 4 is connected to the bearing outer ring 6, a similar flange can also be connected to the bearing inner ring.

Based on FIGS. 1 and 2 a manufacturing method is illustrated below wherein the connection between the flange 4 and the bearing outer ring 6 is produced inside an injection mold, which is comprised of a first partial injection mold 8a and a second partial injection mold 8b. The partial injection mold 8b additionally includes a stamp form 10 movable relative thereto, using which during the manufacturing method a flange section 12, which opposes in a radial direction 16 a groove 14 in the bearing outer ring 6, is pressed into the groove 14. For this purpose the flange 4, in its preconfigured form depicted in FIG. 1, has an inner diameter which is slightly larger than the outer diameter of the bearing outer ring 6 so that flange 4 and bearing outer ring 6 can be positioned such that the groove 14 and the flange section 12 oppose each other radially. In order to make possible a displacement of the material of the flange or of the flange section 12 in the region of the groove 14, the flange further includes at a position radially adjacent to the flange section 12 one or more elevations 20 or formations extending in an axial direction 18 from the otherwise predominantly flat geometry of the flange 4.

Before a further description of the manufacturing method it should be noted that of course any other types of rolling-element bearings according to further exemplary embodiments of the present invention can be provided with a flange. In addition it should be understood that bearing rings of a not-preassembled bearing can also be equipped with flanges by using of further exemplary embodiments of the method, so that the bearing itself can be fully preassembled only in subsequent process steps.

FIG. 2 shows how an undercut of the material of the flange section 12 can be produced with the material of the bearing outer ring 6, thus how material of the flange section 12 can be displaced into the groove 14. For this purpose the flange 4 is initially fixed or fixedly placed with respect to the bearing outer ring 6. In the present case this occurs by driving together of the two partial injection molds 8a and 8b, which axially clamp the flange 4. Subsequently in the present exemplary embodiment an elevation 20 inside the flange section 12 of the flange is deformed such that due to the deforming of the elevation 20 a material of the flange is displaced and the flange section 12 moves at least partially into the groove 14. That is, due to the elastic and/or inelastic deformation of the material of the flange 4 and due to the exerting of a force on the elevation 20 the flange 4 is deformed such that a flange section 12 moves into the groove 14 in order to fix the flange 4 in both axial directions with respect to the bearing outer ring 6.

Figure 3:
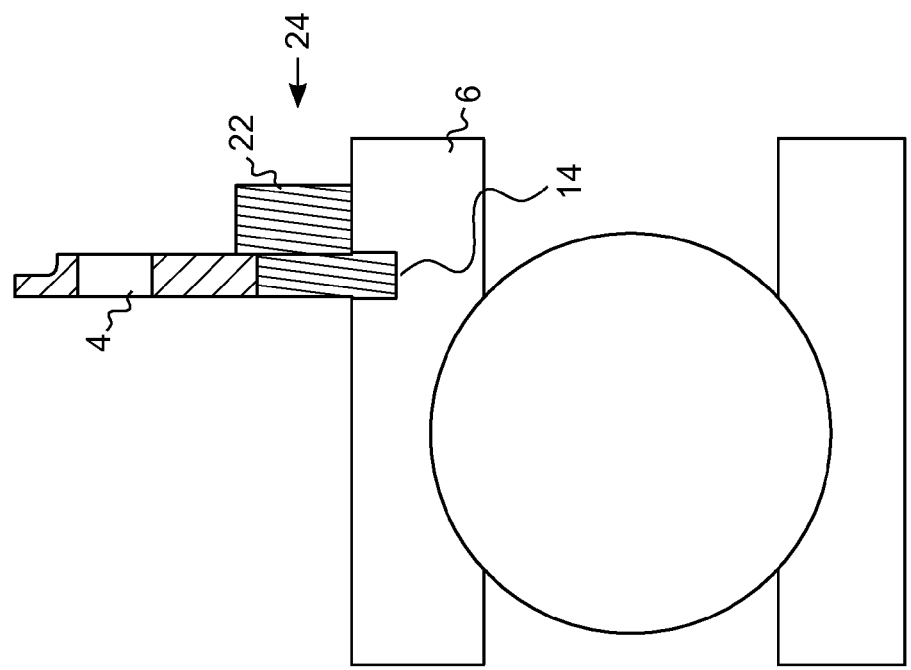
FIG. 3 shows a rolling-element bearing assembly including a flange, manufactured by an exemplary embodiment of an inventive method.

Although with an inelastic deforming of the flange 4 a connection can be produced even without casting compound, in the present manufacturing method illustrated with reference to FIGS. 1 to 3, in the configuration depicted in FIG. 2 a fill material is additionally introduced into the cavity between flange 4 and the two partial injection molds 8a and 8b so that after the hardening of the fill material 22 the configuration or rolling-element bearing assembly depicted in FIG. 3 results, wherein in the connection region, wherein the flange section 12 extends into the groove 14, a hardened fill material 22 is disposed, which can, for example, prevent an elastic spring-back deformation of the elevation 20 and thus stabilize the connection between flange 4 and bearing ring 6. In addition, the fill material 22 can further stabilize the connection by a materially-bonded connection between flange 4 and bearing ring 6. According to preferred exemplary embodiments the fill material is also introduced into an undercut of the groove 14 so that, as illustrated in FIG. 3, it partially surrounds the flange 4 in the groove 14, which can lead to a centering of the flange 4 and to a better stability of the connection.

Deforming the elevation 20, as is shown in FIG. 2, can either occur, as described above, by pressing the two partial injection molds 8a and 8b against each other after which the stamp form 10 is moved relative to the second partial injection mold 8b, or by moving the partial injection mold 8b and the stamp form 10 together.

FIG. 4 shows the above-described components or parts for improving the clarity again in a depiction without the injection molds, so that the individual components are even more clearly visible.

Figure 5:
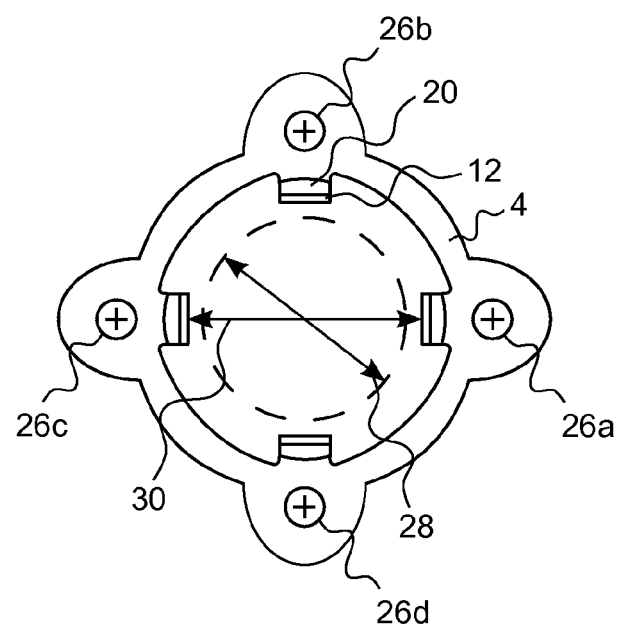
FIG. 5 shows an exemplary embodiment of a flange for use in the manufacturing method.
Figure 6:
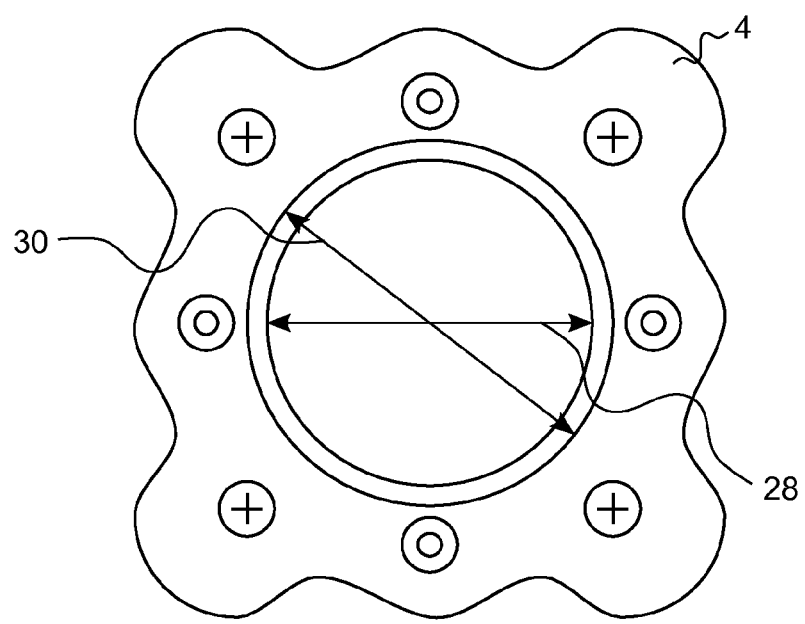
FIG. 6 shows a further exemplary embodiment of a flange.

FIGS. 5 and 6 show two different examples for flange 4, which according to exemplary embodiments of the inventive method can be connected to rolling-element bearings. Here, as can also be seen directly in the figures, the basic geometry of the flange is fully freely determinable and adaptable to the individual conditions. Thus, for example, FIG. 5 shows a flange wherein the flange section 12 and the associated elevations 20 do not completely encircle the central bore. Rather, four mutually-equidistantly-spaced flange sections 12 and elevations 20 are provided, which extend radially inward in the shape of tabs. After connecting of the flange 4 to the bearing outer ring the flange can be axially connected to a housing part via attachment bores 26a to 26d so that the bearing is fixed with respect to the housing part. Here the configuration of the attachment bore is arbitrarily adaptable to the respective geometric conditions and the required strength. Thus, for example, FIG. 6 shows an exemplary embodiment including eight instead of four attachment bores. Simply to improve clarity the diameter 28 of the bearing outer ring 6 is depicted again dashed in FIG. 5, which diameter 28 is slightly smaller than the inner diameter 30 of the flange or of the flange section that extends into the groove after the successful manufacturing method.

FIG. 6 shows an alternative form for a flange 4 for connecting to a bearing outer ring, wherein the flange section radially encircles completely and without interruption, wherein thus along the entire circumference of a completely encircling groove 14 material is displaced into the groove, which can lead to a particularly stable connection. It is to be noted here that although based on the present exemplary embodiments a groove in a bearing outer ring is discussed, which encircles completely and without interruption, so that even with use of an exemplary embodiment shown in FIG. 5 of a flange 4 no relative adjustment of the flange relative to the bearing outer ring need occur in the circumferential direction, according to alternative exemplary embodiments the groove can be interrupted so that, for example, a plurality of equidistant groove sections can be disposed along the circumference, in order to, for example, support a flange of FIG. 5.

In summary, the manufacturing method or the bearing assembly generated thereby can be characterized in that a bearing outer ring 6 including groove 14 as well as a flange 4 including attachment elements or flange sections 12 can be provided wherein—in the case of the generating of a flange on the bearing outer ring—the inner diameter of the bore of the flange is preferably larger than the outer diameter of the bearing. The flange 4 is pushed over the outer ring 6 and fixed or adjusted in a position wherein the groove 14 and the elevation 20 oppose each other radially.

The first partial injection mold 8a receives the bearing outer ring 6 and in addition forms an abutment surface for the flange 4. The second partial injection mold 8b contains an embossing element 10, which is axially displaceable in the tool. The second partial injection mold 8b travels, inter alia, over the other side of the bearing outer ring and clamps the flange 4. After the partial injection molds 8a and 8b are engaged and axially clamp the flange 4, the flange is also radially fixed. The clamping forms a cavity for the plastic-injecting. The embossing tool or the stamp form 10 travels out and presses onto the material inside the flange section. The material is displaced and moves into the groove 14 of the outer ring 6 so that an undercut forms (so that it extends at least partially into the groove), which axially fixes the flange 4 with respect to the bearing outer ring 6. Thereafter plastic is injected into the cavity while the embossing tool 10 continues to maintain the axial force on the elevation 20. After complete cooling or hardening of the fill material the partial injection molds 8a and 8b are opened and the connection of the flange 4 to the bearing is completed. Here the design or the geometry of the flange 4 including the attachment elements can be selected as desired, depending on the desired application. In particular, the shape and the number of the elevations 20 or the shape of the flange section 12 are variable. For example, lugs, embossings, nubs, or other elements can be provided. According to preferred exemplary embodiments, if possible the flange forms undercuts in the region of the overmolding, which can be filled by the plastic, which can lead to a better axial fixing of the connection between plastic and metal-plate. The exact design or exact geometry of the overmolding with respect to the shape of the bearing, of the groove, and of the flange can be selected as desired according to the specific requirements.

Figure 7:
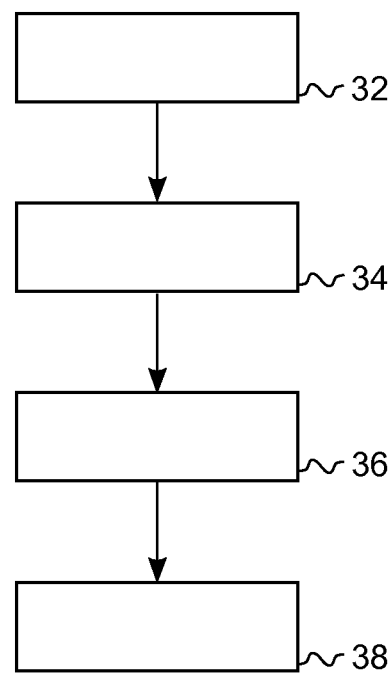
FIG. 7 shows an exemplary embodiment of a method for manufacturing a rolling-element bearing in schematic block view.

FIG. 7 again shows, in the schematic form of a flow diagram, an exemplary embodiment of the inventive method. In a first providing step 32 a bearing ring of the rolling-element bearing is provided including at least one groove disposed on a circumference of the bearing, extending along the circumference. In a second providing step 34 a flange is provided including at least one flange section for connecting to the bearing ring at a radially inner or outer end of the flange.

In an adjusting step 36 the flange section is disposed adjacent to the groove in a radial direction and the flange is fixed relative to the bearing ring. In a final deforming step 38 the material of the flange inside the flange section is deformed such that a material of the flange is displaced by the deforming and the flange section moves at least partially into the groove.

The optional steps already mentioned above of the molding of the vicinity of the connection region and possible further steps are not described here again for reasons of clarity.

Merely for the sake of completeness, FIGS. 8a and 8b show a sectional view through a deep groove ball bearing as well as through a flange to be connected to the deep groove ball bearing during the manufacturing according to a further exemplary embodiment of the method.

According to this exemplary embodiment the flange 4 includes no elevation in its flange section 12, so that a flat flange, possibly prefabricated by a simple stamping process, can be used, which is particularly cost-effective to preproduce. Since the other steps for manufacturing a rolling-element bearing correspond to those that have already been discussed with reference to the exemplary embodiment of FIGS. 1 to 6, a new detailed discussion thereof is omitted here.

Although, as depicted in FIG. 8b, the specific shape of the undercut of the material of the flange 4 in the groove 14 may differ from that of the exemplary embodiment of FIGS. 1 to 4, it allows the exemplary embodiment depicted in FIGS. 8a and 8b to provide, in an equally simple manner, a bearing assembly having the same positive properties.

In summary, due to the exemplary embodiments of the present invention a bearing including a flange can be provided in an extremely efficient and cost-effective manner. Among other things, in this way an extremely high flexibility in the sense of a modular system can be provided in order to serve many possible application scenarios without having to produce expensive new tools.

REFERENCE NUMBER LIST

2 Ball bearing
4 Flange
6 Bearing outer ring
8a,b Partial injection mold
10 Stamp form
12 Flange section
14 Groove
16 Radial direction
18 Axial direction
20 Elevation
22 Fill material
24 Connection area
26a-d Attachment bore
28 Bearing outer ring diameter
30 Flange diameter

The invention claimed is:

1. A rolling-element bearing assembly, comprising:
a bearing ring including a groove disposed on a circumference of the bearing ring and extending along the circumference;
a flange adjacent to the bearing ring in a radial direction including at least one flange section extending, in a connecting region, in the radial direction at least partially into the groove such that a radially inner surface of the flange section does not contact a bottom surface of the groove, the flange being a one-piece, annular member such that the flange has no seams extending radially therethrough, and wherein a portion of the flange section that is located within the groove has a rectilinear shape in cross-section; and
a hardened casting material in the connection region, the hardened casting material at least partially disposed between the bottom surface of the groove and the radially inner surface of the flange section.

2. The rolling-element bearing assembly according to claim 1, wherein the hardened casting material is connected in an interference-fit- or materially-bonded-manner at least to the flange section adjacent to the groove.

3. The rolling-element bearing assembly according to claim 1, wherein the groove completely encircles the bearing ring.

4. The rolling-element bearing assembly according to claim 1,
wherein the hardened casting material is connected in an interference-fit- or materially-bonded-manner at least to the flange section adjacent to the groove,
wherein the groove completely encircles the bearing ring.

5. A rolling-element bearing assembly, comprising:
a bearing ring having a surface including at least one circumferential groove extending at least partially around the bearing ring;

a flange projecting radially inwardly or radially outwardly from the surface, the flange having a flange section at a radially inner edge or radially outer edge of the flange, the flange section projecting into the groove, and a hardened casting material securing the flange to the surface, wherein the flange section comprises a continuous annular portion of the radially inner edge or the radially outer edge of the flange spaced from the flange by an elevation extending away from the flange in an axial direction.

6. The rolling element bearing assembly according to claim 5, wherein the at least one groove completely encircles the bearing ring.

7. The rolling element bearing assembly according to claim 5, wherein the hardened casting material extends into the at least one groove.

8. The rolling element bearing assembly according to claim 5, wherein the groove has an axial width and the flange section has a width in the axial direction less than the axial width of the groove and wherein the hardened casting material fills an axial gap between the flange section and the groove.

9. A method for manufacturing a rolling-element bearing including a flange, comprising:

providing a bearing ring including a groove disposed on a surface of the bearing ring and extending in a circumferential direction;

providing the flange including at least one flange section configured to connect the flange to the bearing ring at a radially inner end of the flange and a bore section, when viewing the flange in cross section the bore section comprises first and second axially opposed, radially extending surfaces having a bore extending therebetween, wherein the flange section includes an elevation extending axially away from the first and second axially opposed, radially extending surfaces of the flange, the elevation being located with respect to a radial direction entirely between a radially inner surface and a radially outer surface of the flange such that a first axial end of the radially inner surface is aligned with the first axially opposed, radially extending surface with respect to the radial direction and a second axial end of the radially inner surface is aligned with the second axially opposed, radially extending surface with respect to the radial direction;

disposing the flange section adjacent to the groove at a radial distance from the groove and fixing the flange relative to the bearing ring;

deforming a material of the flange in the flange section such that the material of the flange is displaced by the deforming and the flange section moves at least partially into the groove; and applying a hardening casting material to a region where the flange section extends into the groove while the flange is held in a deformed state.

10. The method according to claim 9, wherein the deforming comprises pressing the elevation toward the first and second axially opposed, radially extending surfaces.

11. The method according to claim 9, wherein the flange is fixed with respect to the bearing ring using a closing tool form.

12. The method according to claim 11, wherein the flange is deformed by a stamp form movable with respect to a base form of the closing tool form.

* * * * *